Dec. 10, 1968     A. SABATINO ET AL     3,415,220
APPARATUS FOR FLUXING AND PREHEATING PLATES OF A BATTERY STACK
Original Filed Dec. 30, 1960     7 Sheets-Sheet 1
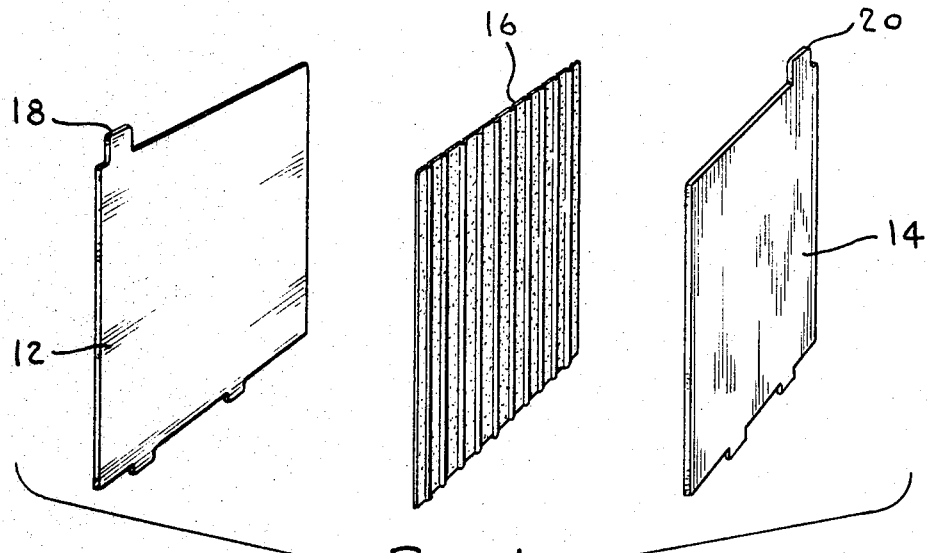
FIG. 1
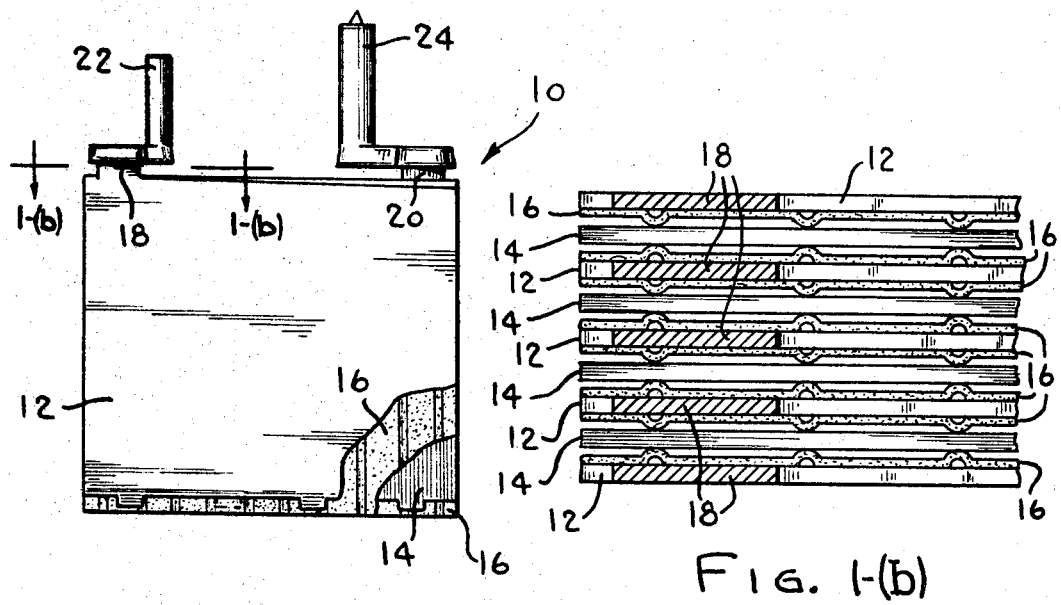
FIG. 1-(a)     FIG. 1-(b)
INVENTORS
ANTHONY SABATINO
RICHARD A. BUTTKE
PAUL V. LOWE
BY John W. Michael
ATTORNEY

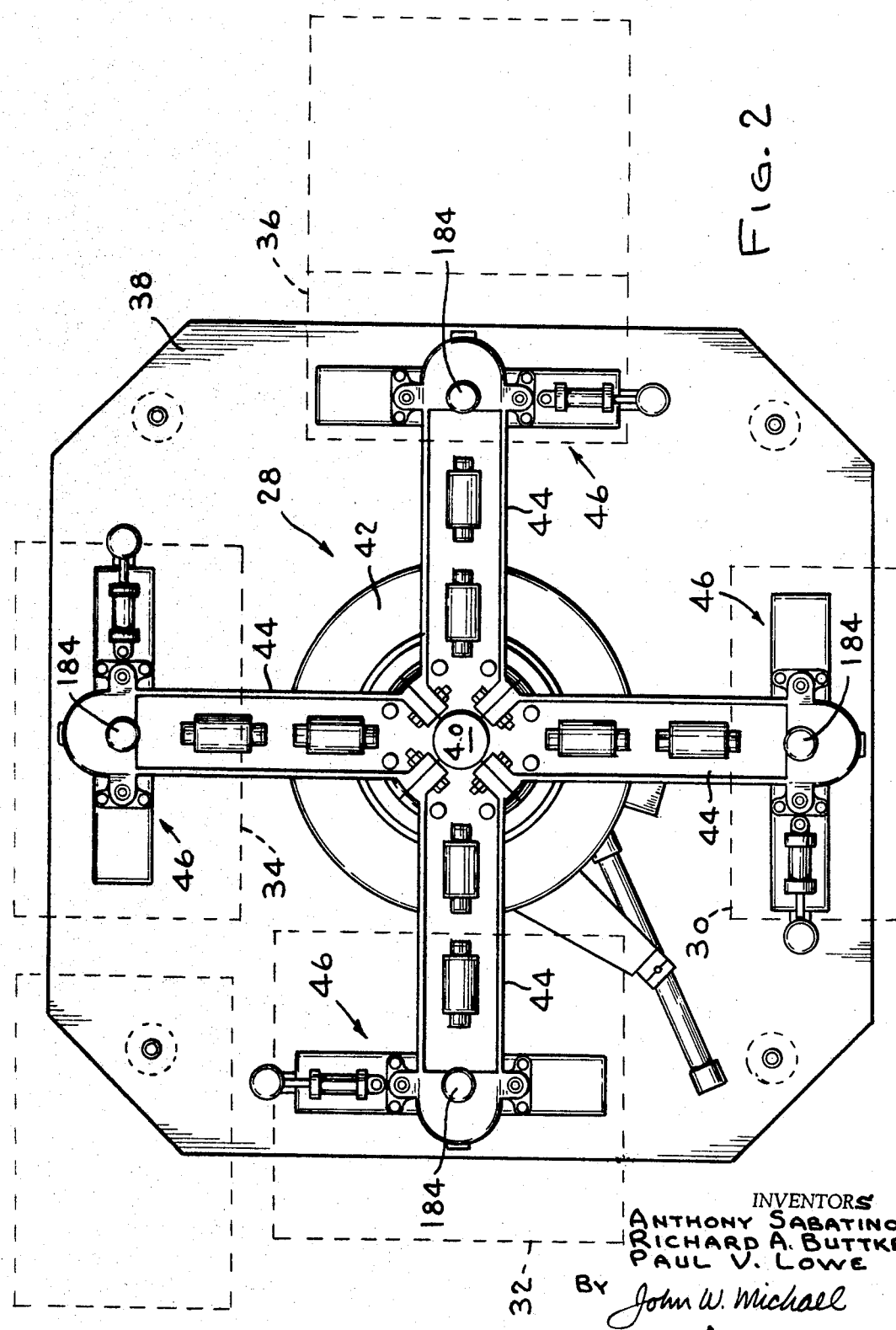

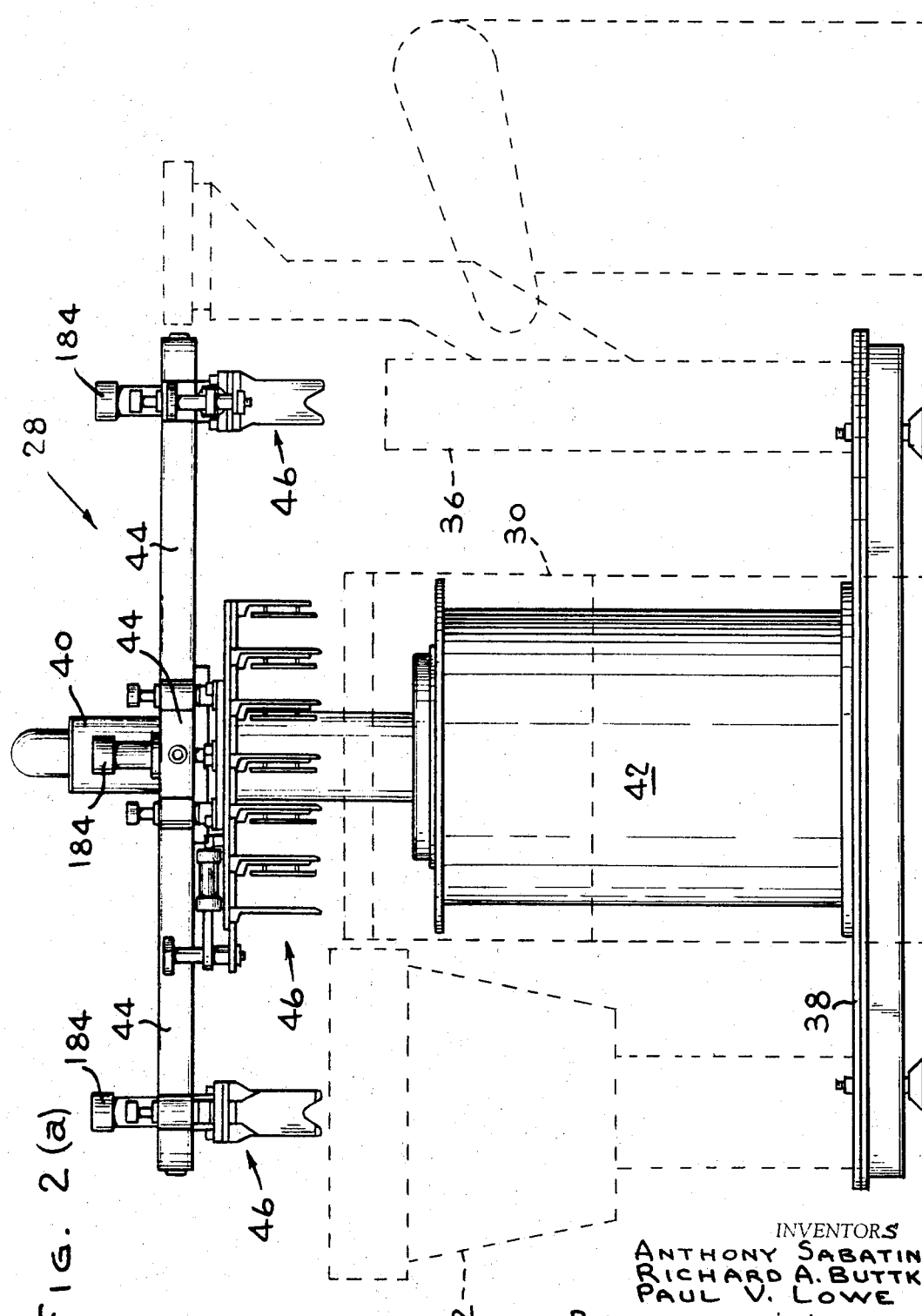

INVENTORS
ANTHONY SABATINO
RICHARD A. BUTTKE
PAUL V. LOWE
BY John W. Michael
ATTORNEY INVENTORS
ANTHONY SABATINO
RICHARD A. BUTTKE
PAUL V. LOWE
BY John W. Michael
ATTORNEY

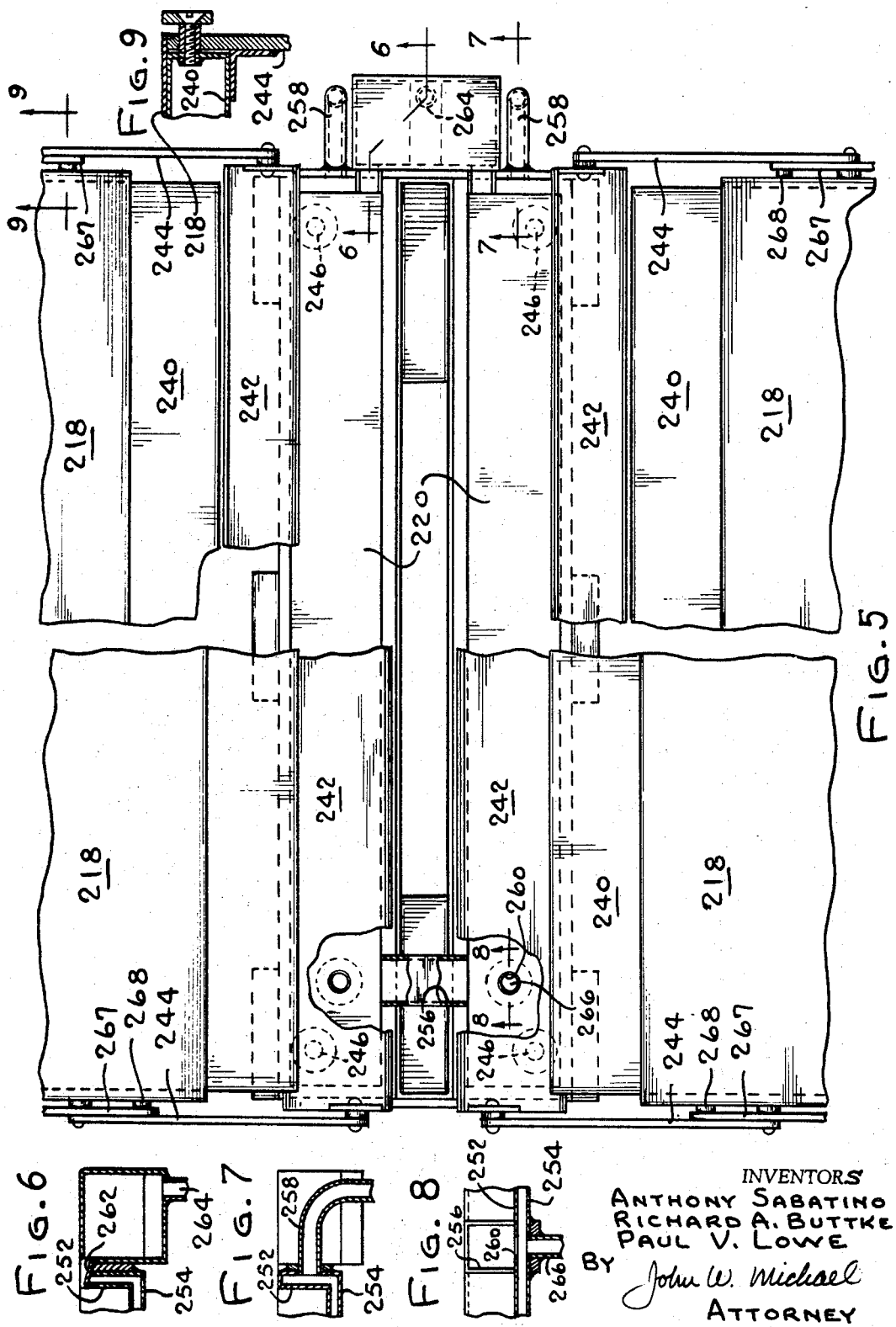

INVENTORS
ANTHONY SABATINO
RICHARD A. BUTTKE
PAUL V. LOWE
BY John W. Michael
ATTORNEY United States Patent Office 3,415,220
Patented Dec. 10, 1968

3,415,220
APPARATUS FOR FLUXING AND PREHEATING PLATES OF A BATTERY STACK
Anthony Sabatino, Minneapolis, Minn., and Richard A. Buttke and Paul V. Lowe, Milwaukee, Wis., assignors to Globe-Union Inc., Milwaukee, Wis., a corporation of Delaware
Original application Dec. 30, 1960, Ser. No. 79,728, now Patent No. 3,253,306, dated May 31, 1966. Divided and this application Sept. 16, 1965, Ser. No. 487,870
7 Claims. (Cl. 118—58)

ABSTRACT OF THE DISCLOSURE

A fluxing mechanism for applying flux to the plates of a battery stack employed in machinery for fabricating storage battery elements. The mechanism includes a flux tray adapted to hold a flux material and a battery stack transfer mechanism for moving the battery stack in and out of contact with the flux in the tray to thereby apply flux material to the stack. A heater mechanism is movably mounted at one side of the flux tray for movement toward and away from the tray. A heater mechanism is operatively associated with the stack transfer mechanism so that as a battery stack is moved into and out of contact with the flux by the stack transfer mechanism, the heater mechanism will be moved toward and away from the tray. A movable cover mechanism is provided for the flux tray and is operatively connected to the heater mechanism so that the cover will close and open over the tray as the heater mechanism is moved toward and away from the tray. In operation, as the battery stack is lowered toward the flux tray, the movable cover will move to its open position and the heater mechanism will move away from the tray. After the battery stack has been lowered into contact with the flux material in the tray, it is withdrawn therefrom at which time the cover is moved to its closed position and the heater mechanism is moved inwardly toward the tray to a position adjacent the battery stack at which time hot air is directed towards the portion of the stack to which the flux has been applied. The hot air not only drives off the flux solvent but also acts to activate the flux to reduce part of the lead oxide on the stack to free lead. In addition, the hot air also serves to preheat the lugs for the welding operation which follows.

Figure 3:
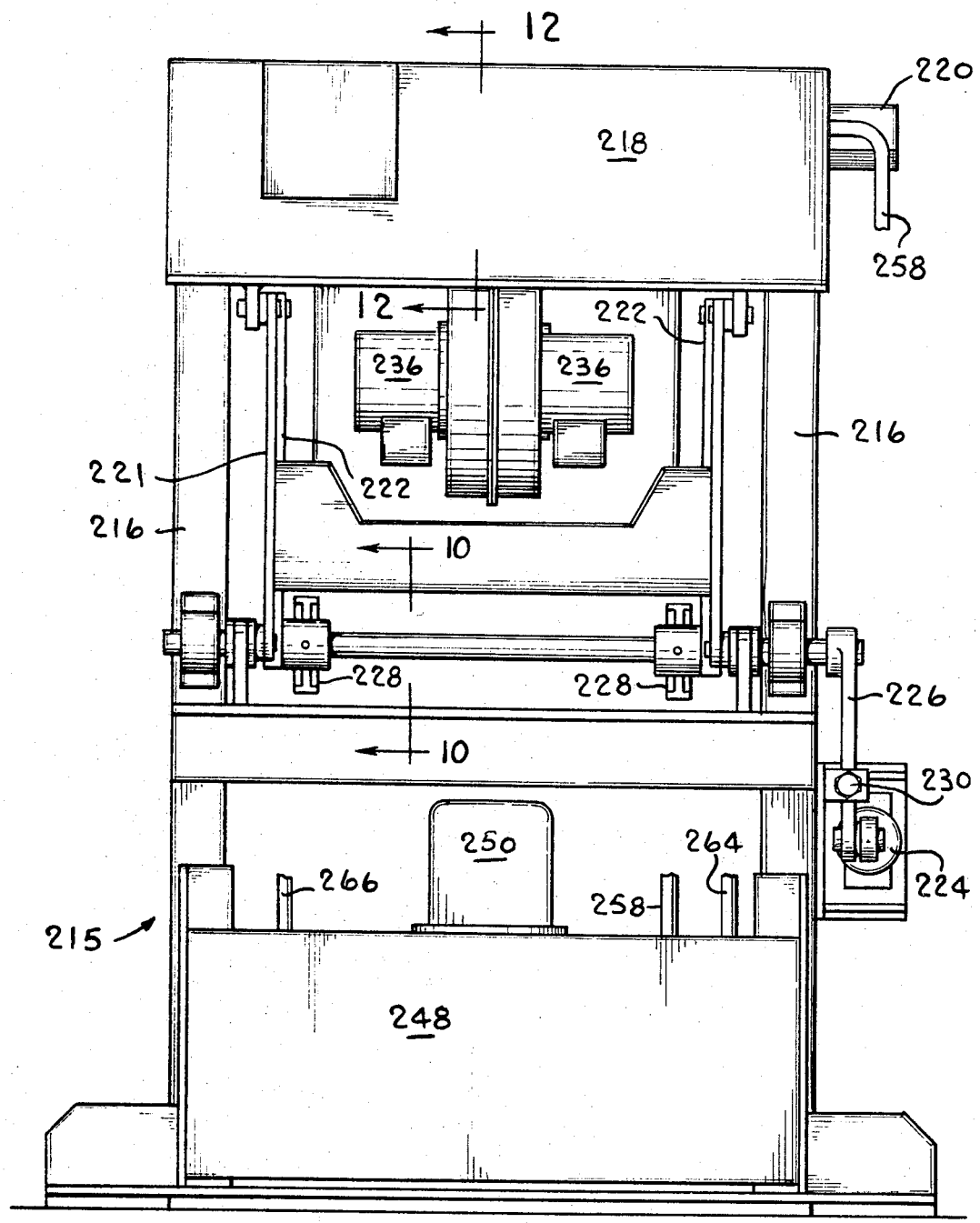

This application is a division of Ser. No. 79,728, filed Dec. 30, 1960 (now U.S. Patent No. 3,253,306), and assigned to the assignee of this application.

This invention relates to a machine for fabricating elements for a storage battery and more particularly to a mechanism for applying flux to and preheating the plates of a battery stack in accordance with the method described and claimed in United States Patent No. 3,087,005.

The principal object of this invention is to provide a mechanism which will apply flux to the lugs of a battery stack and which will also preheat such lugs both at a maximum rate of production and with a minimum amount of operator attention.

A further object is to provide a mechanism for performing the functions mentioned above which provides a high degree of automatic operation and is of relatively simple construction and occupies a relatively small amount of floor space.

Figure 4:
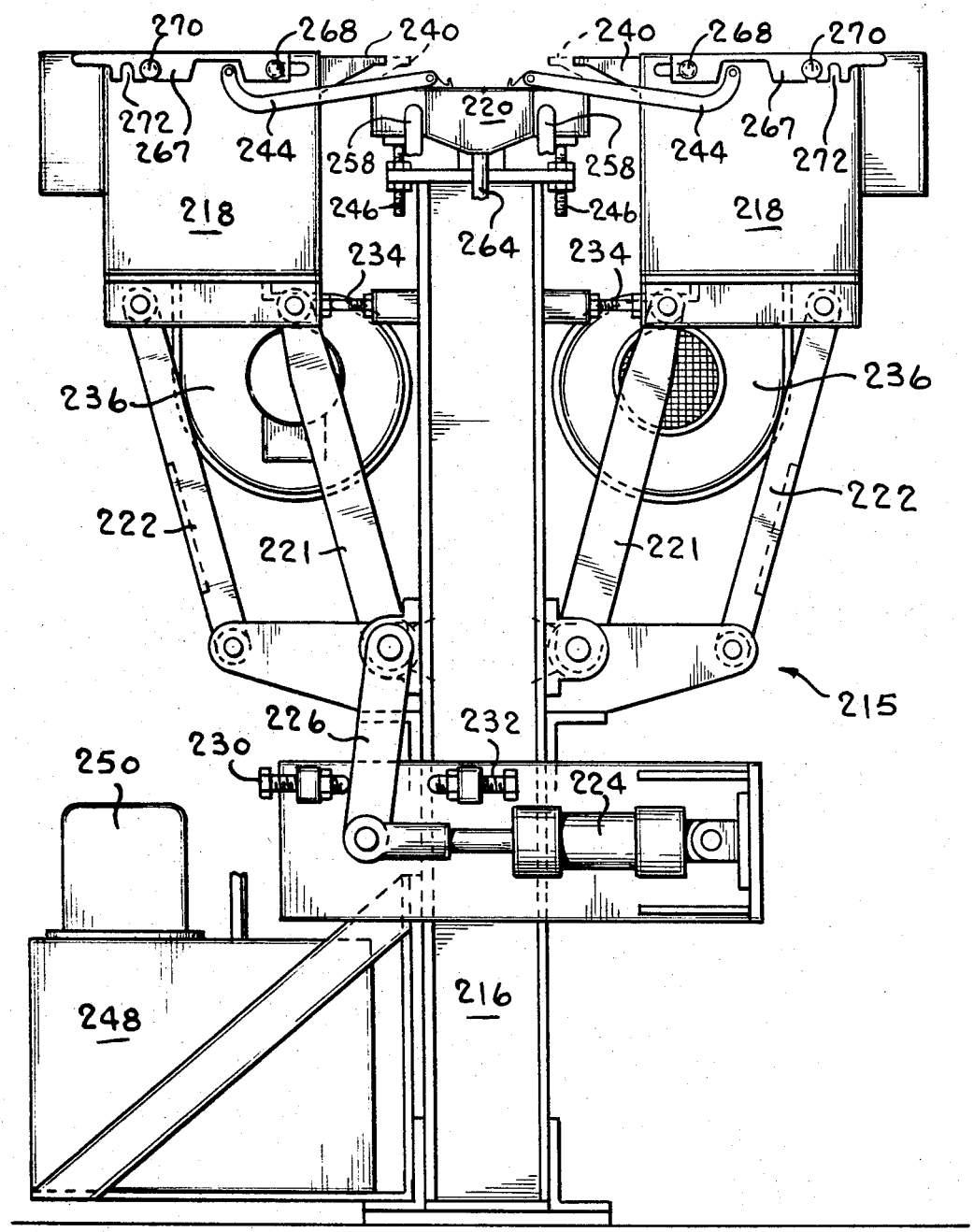
Figure 11:
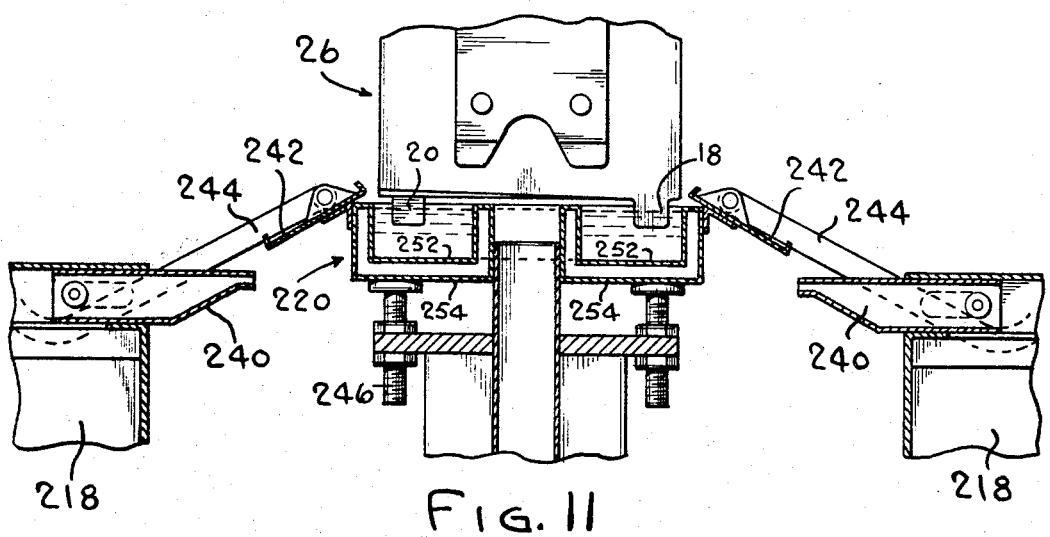
Figure 12:
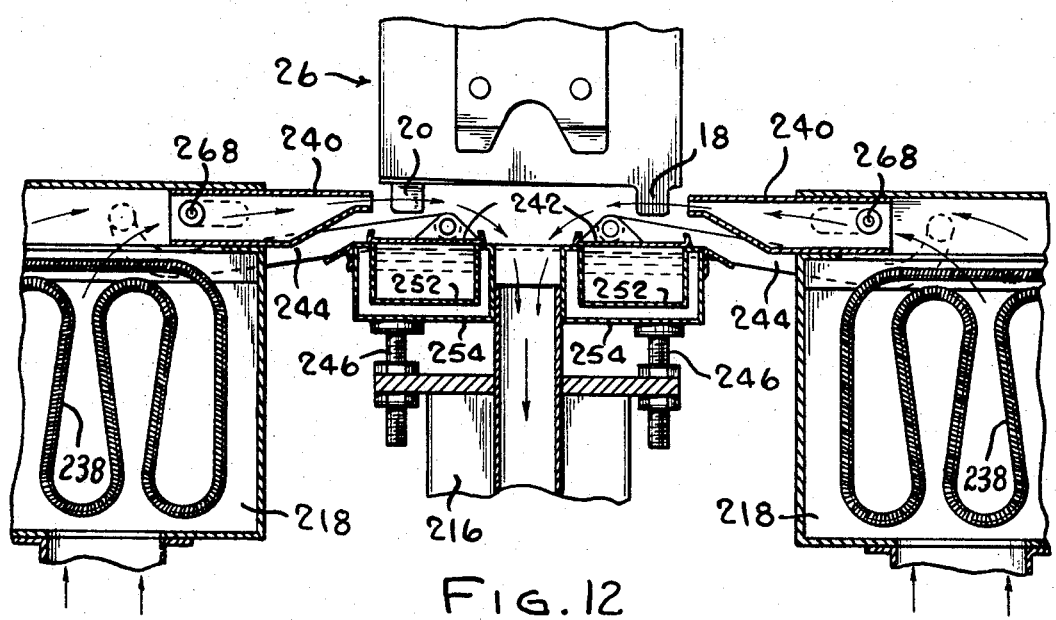
Figure 10:
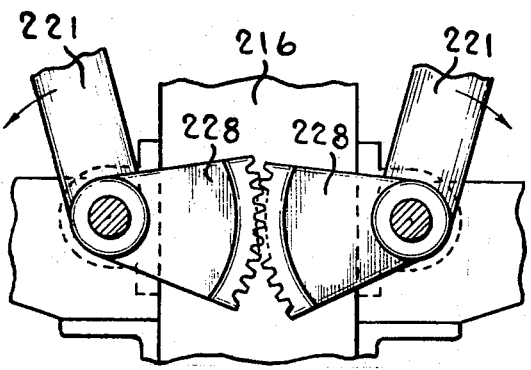

Other objects and advantages will be pointed out in, or be apparent from the description and claims, as will obvious modifications of the single embodiment shown in the drawings, in which:

FIG. 1 is a perspective view of two plates and a separator of a battery stack;
FIG. 1(a) is a side elevation view of a battery element with parts broken away;
FIG. 1(b) is a sectional view taken along line 1(b)—1(b) of FIG. 1(a);
FIG. 2 is a top plan view of the transfer mechanism of the machine showing the load and alignment station, flux station, casting station and unloading station in dotted lines;
FIG. 2(a) is a side elevation view of the machine shown in FIG. 2 as viewed from the load and alignment station;
FIG. 3 is a side elevation view of the flux and preheat apparatus at the flux station;
FIG. 4 is an end elevation view of the apparatus shown in FIG. 3;
FIG. 5 is a fragmentary top elevation view of the apparatus shown in FIG. 3 with the left hand portion showing the heater boxes retracted and the covers closed and the right hand portion showing the heater boxes extended with the covers open;
FIGS. 6, 7, 8 and 9 are sectional views taken along lines 6—6, 7—7, 8—8 and 9—9, respectively, of FIG. 5;
FIG. 10 is a sectional view taken along line 10—10 of FIG. 3;
FIG. 11 is a sectional view taken along line 11—11 of FIG. 3; and
FIG. 12 is a view similar to FIG. 11 but showing the flux tray covers closed and the heater boxes retracted to preheat position.

The machine of this invention is designed for fabricating storage battery elements 10 of the type shown in FIGS. 1, 1(a) and 1(b). Each element 10 is comprised of negative and positive plates 12 and 14, respectively, alternately arranged between suitable separators 16. Plates 12 and 14 have lugs 18 and 20, respectively, to which post straps 22 and 24 are welded to form a complete element. The post of strap 24 serves as one of the battery terminals (positive) and is therefore heavier and longer than the post of strap 22. The plates and separators prior to attachment of the post straps are generally referred to as "stacks" and will hereinafter be identified by the reference numeral 26.

As explained in Patent No. 3,087,005, there are four major steps in the improved method described in such application for making a storage battery element.

The first step is to accurately align the stack. The second is the application of a suitable flux to the lugs of the plates. The third is the preheating of the lugs, and the fourth is the combined casting and welding operation wherein suitable post straps are cast onto the lugs.

A machine for performing the above steps is the subject matter of this application. The machine includes a stack transferring mechanism 28 (FIGS. 2, 2(a)) adapted to transfer a plurality of stacks 26 between a load and alignment station 30, a flux and preheat station 32, a casting station 34 and an unload station 36 (shown in dotted lines on FIG. 2).

The stack transferring mechanism 28 is mounted on a platform base 38 and includes a central column 40 rotatably mounted in a column support structure 42 as shown in FIG. 2(a). Four equally angularly spaced radially extending transfer arms 44 are mounted on the upper end portion of column 40. At the end of each transfer arm 44 is mounted a transfer head 46 adapted to pick up a plurality of stacks 26 and transfer them between stations.

The machine shown in the drawings is set up to handle a batch of six (6) stacks of plates and separators which, when farbricated into elements, form a complete set of elements for use in the six cells of a 12-volt storage battery. It should be understood, however, that the machine can be modified to handle various numbers and types of stacks.

The mechanism of this invention is designed to apply a suitable flux to the lugs 18 and 20 of the plates which make up stacks 26. As explained in U.S. Patent No. 3,087,005, the use of a suitable flux insures proper fusion of the post straps 22 and 24 to the lugs by the "cast-on" method without extensive prior cleaning of the plates and/or the close maintenance of critical lead, mold and plate temperatures.

The automatic fluxing and preheat mechanism 215 is shown in FIGS. 3-12 and includes a frame 216 having a pair of heater boxes 218 and a flux tray 220 mounted thereon. Heater boxes 218 are pivotally mounted for movement in and out from frame 216 by pairs of arms 221, 222. The boxes are pivoted on the frame by a pivoting cylinder 224 operatively connected to the left hand arm 221 by a link 226 as shown in FIG. 4. The motion of the left hand arm 221 is transmitted to the right hand arm by a pair of spur gear segments 228 as shown in FIG. 10. The movement of link 226 is limited by adjustable stops 230, 232 and the "retracted" or "preheat" position of boxes 218 is set by adjustable stops 234.

Each heater box 218 is provided with a blower 236, electric heating coils 238 and an adjustable nozzle 240 for preheating the plate lugs as will presently be described.

Flux tray 220 is provided with a pair of covers 242 connected to heater boxes 218 by arms 244 which are adapted to move the covers between an open position (FIG. 11) and a closed position (FIG. 12) as the heater boxes are pivoted on the frame by cylinder 224. The elevation of flux tray 220 can be adjusted by support bolts 246 on frame 216 as shown in FIGS. 11 and 12.

Flux is continuously circulated to tray 220 from a supply tank 248 by a flux pump 250 (FIG. 4). Tray 220 is comprised of spaced pairs of inner and outer containers 252 and 254, respectively, interconnected by a canal 256. Flux enters outer containers 254 through inlet conduits 258 (FIG. 7) and enters inner containers through openings 260 (FIG. 8). The flux recirculates from containers 252 over overflow weirs 262 (FIG. 6) and then down to the tank through a return conduit 264. A pair of drain conduits 266 are provided as shown in FIG. 8 to drain the tanks.

When the transfer head 46 carrying a batch of stacks 26 is indexed to the flux and preheat station 32, cylinder 224 has been energized to pivot heater boxes 218 outwardly away from frame 216 to thus move covers 242 to the open position as shown in FIG. 11 and the right-hand portion of FIG. 5. Flux is then applied to the lugs 18 and 20 of the plates by lowering the stacks to the position shown in FIG. 11 by energizing cylinder 184 of the transfer head mechanism shown in FIG. 2(a). The transfer head 46 and stacks 26 carried thereby are then raised to the position in FIG. 12 to facilitate the next step which is the preheating of the lugs.

Preheating occurs after heater boxes 218 have been pivoted to the preheat position shown in FIG. 12 (and in the left hand portion of FIG. 5) by energizing cylinder 224. The retracting movement of the heater boxes will cause covers 242 to close over flux tray 220. Air heated by elements 238 is then blown across the lugs by blowers 236 which force air through openings in the bottom of the boxes across the heating elements therein and then through nozzles 240 onto the lugs. The hot air not only drives off the flux solvent but also acts to activate the flux to reduce part of the lead oxides on the lugs to free lead. The hot air also serves to preheat the lugs for the welding operation which follows.

Upon completion of the preheating step, blowers 236 are shut off and heater boxes are pivoted back out from the frame to permit indexing of the fluxed and preheated stacks to the casting station 34 and the indexing of a subsequent batch of stacks into the flux station.

It is noted that hot air nozzles 240 can be adjusted on the heater boxes for handling stacks 26(a) of reduced width. To make the adjustment, nozzle levers 267 (FIG. 4) are simply pivoted on pins 268, and then pushed inwardly toward the stacks until pins 270 can be engaged by notches 272 in the levers.

Operation

When the stacks are indexed to the flux and preheat mechanism 215, cylinder 224 thereof will have been energized to pivot the heater boxes 218 outwardly from the frame which at the same time opens the covers 242 of flux tray 220. Flux is then applied to the lugs of the plates by lowering the stacks to the position shown in FIG. 11 by energizing cylinder 184. The transfer head and stacks are then raised to the position shown in FIG. 12 for preheating.

To preheat, the heater boxes 218 are pivoted to the preheat position shown in FIG. 12 by energizing cylinder 224. The retracting movement of the heater boxes will cause covers 242 to close over the flux tray 220. Air heated by elements 238 is then blown across the lugs by blowers 236 which force air out through nozzles 240 onto the lugs.

Upon completion of the preheating step blowers 236 are shut off and heater boxes are pivoted back out from the frame to permit indexing of the fluxed and preheated stacks to the casting station 34.

Although but a single embodiment of the present invention has been illustrated and described, it will be apparent to those skilled in the art that various changes and modifications may be made therein without departing from the spirit of the invention or from the scope of the appended claims.

We claim:

1. Fluxing mechanism for applying flux to the plates of a battery stack comprising:
   a flux tray adapted to hold a flux;
   stack transfer mechanism for moving a battery stack in and out of contact with the flux in said flux tray; and
   heater mechanism movably mounted at one side of said tray for movement toward and away from said tray, said heater mechanism including a source of hot air for heating the plates of a stack and further including a drive mechanism operatively associated with said stack transfer mechanism for moving said heater mechanism toward and away from said tray as a battery stack is moved into and out of contact with the flux by said stack transfer mechanism.

2. Fluxing mechanism according to claim 1 in which said flux tray has a movable cover mechanism operatively connected to said heater mechanism, said cover mechanism adapted to close and open over said tray as said heater mechanism is moved toward and away from said tray.

3. Fluxing mechanism according to claim 1 in which said heater mechanism further includes a pair of heater boxes pivotally mounted on opposite sides of said flux tray, each of said heater boxes including a blower, an electric heating coil, and a nozzle for directing a flow of hot air onto the plates of the battery stack.

4. Fluxing mechanism according to claim 1 in which said flux tray is provided with a flux pump and a supply tank for circulating liquid flux to the tray.

5. Fluxing mechanism according to claim 1 in which said stack transfer mechanism includes a transfer arm having a transfer head movably mounted thereon, said transfer head adapted to pick up a battery stack and move it vertically into and out of contact with the flux in said flux tray.

6. Fluxing mechanism for applying flux to the plates of a battery stack comprising:
 a flux tray adapted to hold a flux;
 heater mechanism movably mounted at one side of said tray for movement toward and away from said tray, said heater mechanism including a source of hot air for heating the plates of a stack and further including a drive mechanism responsive to movement of the battery stack for moving said heater mechanism toward and away from said tray as a battery stack is moved into and out of contact with the flux in said tray.

7. Fluxing mechanism according to claim 6 in which said flux tray has a movable cover mechanism operatively connected to said heater mechanism, said cover mechanism adapted to close and open over said tray as said heater mechanism is moved toward and away from said tray.

References Cited

UNITED STATES PATENTS

| | | | |
|---|---|---|---|
| 602,532 | 4/1898 | Wilder | 118—63 X |
| 1,799,465 | 4/1931 | Holloway | 228—36 X |
| 2,079,614 | 5/1937 | Holt et al. | 118—58 |

WALTER A. SCHEEL, *Primary Examiner.*

JOHN P. McINTOSH, *Assistant Examiner.*

U.S. Cl. X.R.

118—429, 425, 426